Dec. 19, 1939.   C. W. GERHARDT   2,184,184

HYDRAULIC SHOCK ABSORBER VALVE

Filed Feb. 28, 1938

INVENTOR
CARL W. GERHARDT
BY
Spencer, Hardman and Fisher
ATTORNEYS

Patented Dec. 19, 1939

2,184,184

UNITED STATES PATENT OFFICE 2,184,184

HYDRAULIC SHOCK ABSORBER VALVE

Carl W. Gerhardt, Dayton, Ohio, assignor to General Motors Corporation, Detroit, Mich., a corporation of Delaware Application February 28, 1938, Serial No. 192,982

7 Claims. (Cl. 188—100)

This invention relates to improvements in hydraulic shock absorbers.

It is among the objects of the present invention to provide a quietly operating fluid flow control device for a hydraulic shock absorber.

A further object of the present invention is to provide a hydraulic shock absorber with a fluid flow control device adapted to permit a constantly restricted flow of fluid in two directions within the shock absorber and also adapted when actuated by fluid pressure to provide for an additional, variably restricted flow of fluid in one direction only.

Further objects and advantages of the present invention will be apparent from the following description, reference being had to the accompanying drawing wherein a preferred embodiment of the present invention is clearly shown.

Figure 1:
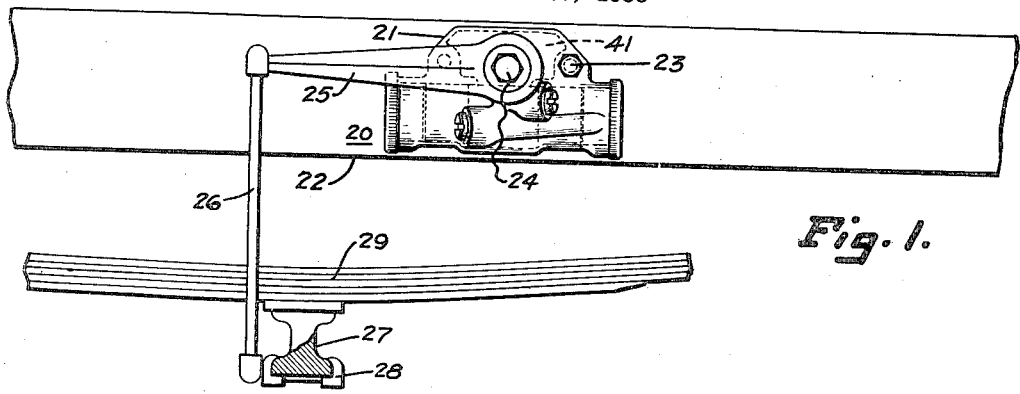
Figure 1 is a fragmentary view showing a shock absorber equipped with the present invention, attached to the frame of the vehicle and connected with the axle.

The shock absorber of the present invention is designated as a whole by the numeral 20. It comprises a casing 21 adapted to be secured to the frame of the vehicle by means of bolts 23. The casing 21 has a shaft 24 journaled transversely in it, one end of said shaft extending to the outside of the casing and having the shock absorber operating arm 25 secured thereto in any suitable manner. The outer, or free end of this arm 25, is swivelly secured to the one end of a link 26, the opposite end of which is anchored to the axle 27 by means of the clamping member 28. The axle 27 supports the spring 29 of the vehicle, the ends of the spring 29 being hingedly secured to the frame. This hinged connection is not shown in the present drawing but is of standard construction.

Casing 21 of the shock absorber provides a cylinder 30, the ends of which are closed by cylinder heads 31 and 32 respectively. Within this cylinder 30 there is provided a piston comprising two portions 33 and 34 secured together by studs or bolts 35 and 36. Recesses in the adjacent ends of the piston portions 33 and 34 cooperate to provide a chamber adapted to receive the end of the operating cam 38 which is secured to the shaft 24 within the shock absorber. The portion of cam 38 extending into the recesses of the adjacent piston portions engages wear-resisting contact buttons 39 and 40 supported by the piston portions 33 and 34 respectively.

The piston head portion 33 forms the fluid displacement chamber 35 at the end of the cylinder closed by the cylinder head 31. Likewise, piston portion 34 forms the fluid displacement chamber 46 at the end of the cylinder closed by the cylinder head 32. Each piston head portion has a valve mechanism within a passage provided in the said portion, this valve mechanism providing for a flow in fluid into the respective displacement chambers as the piston moves away from its respective cylinder end. Inasmuch as these valve mechanisms are identical only one will be described detailedly.

Each piston portion has a passage 50 about which an annular valve-seat 51 is provided. The intake valve for controlling the flow of fluid through said passage 50 is designated by the numeral 52 and is normally urged upon the valve-seat 51 by the spring 53, interposed between the valve and a retainer ring 54 secured in an annular notch in the piston portion. It will be seen that the passage 50 in the piston provides communication between the displacement chamber and the intermediate chamber or reservoir 41. Thus as the piston moves toward the right as regards Figure 2, fluid within the passage 50 will move valve 52 from seat 51 against the effect of spring 53, permitting a substantially unrestricted flow through the passage 50 past the valve 52 and its valve-seat 51 into the displacement chamber 45. As the piston moves toward the left the valve mechanism within the piston portion 34 will act similarly, thus permitting fluid to flow from the reservoir or intermediate chamber 41 into the displacement chamber 46.

Ducts are provided in the casing for permitting communication between the displacement chambers 45 and 46. One of these ducts is designated by the numeral 60 and leads from the chamber 45 into the valve chamber 61. Another duct 62 leads from the displacement chamber 46 into the valve chamber 63. To complete communication between the displacement chambers, valve chamber 61 communicates with duct 62 through a passage 64 shown in dotted lines in Figure 2. Valve chamber 63 has a similar passage 65 leading from it to the duct 60.

The duct 62 is normally closed by a valve 62a under the influence of the spring 62b. This valve will permit fluid to flow from chamber 46 through duct 62 into the valve chamber 63 and then through passage 65, duct 60 into the opposite displacement chamber 45, only after the valve 62a been moved against the effect of spring 62b in response to a predetermined fluid pressure within chamber 46. It will be noted that a flow of fluid from chamber 45 through duct 60 into valve chamber 63 and thence into duct 62 is prevented by the presence of this one way acting valve 62a within the chamber 63.

The improved fluid flow control device of the present invention is provided within the valve chamber 61. This improved device is clearly illustrated in Figure 3. It consists of a valve 69 having a body portion 70 which is of lesser diameter than the diameter of the duct 60. The valve body has a valve flange 71 intermediate its ends, said flange being shown in Figure 3 to have an angular outer peripheral surface. This flange of the valve engages the shoulder 72 formed by the valve chamber 61. In the surface of the valve-flange engaging valve seat 72 there is provided an annular groove 73, defining a sharp edged seat designated by the numeral 74. The portion of the valve body which extends from one side of the valve flange 71 and into the duct 60 forms a pilot which is recessed, as at 75. A side opening 76 is provided in the cylindrical wall of this recessed pilot portion of the valve. Inasmuch as the pilot portion of the valve 69, extending into the duct 60 is of lesser diameter than said duct, the annular groove 73 will at all times be in communication with the duct.

Another annular groove 77 is provided in the face of the valve more remote from the valve-seat 72. Fluid flow restricting orifices 78 provide constant communication between the grooves 73 and 77 in the valve flange.

Figures 3, 4:
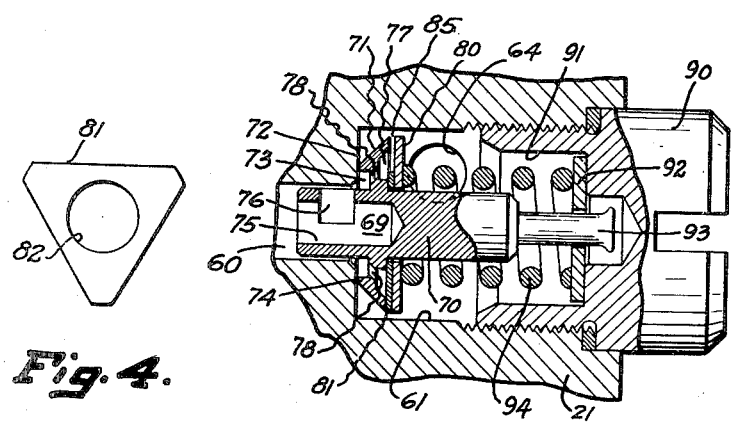
Figure 3 is an enlarged fragmentary, sectional view taken substantially along the lines 3—3 of Figure 2 and illustrates one of the fluid flow control devices of the shock absorber.
Figure 4 is a detailed view of one of the elements of the improved fluid flow control devices.

A spacer washer 81, having a central opening 82, is supported on the body 70 of this valve 69. This spacer washer may be shaped as shown in Figure 4 and is of selected thickness so as to hold the rigid baffle plate or disc 80 a predetermined distance from the valve flange 71. Thus a predetermined opening 85 is provided through which the fluid may flow into or out of the annular groove 77. Opening 85 impedes the flow of fluid into and out of this annular groove; however, this impedance is preferably always of a lesser degree than the impedance or restriction to fluid flow by the fluid flow orifices 78. The valve-seat 72 acts to impede fluid flow into and out of the annular grove 73 in a similar manner yet the impedance of this fluid flow is preferably at all times also less than the restriction or impedance to fluid flow by the orifices 78.

The valve body 70 has an extension 93 received by a recess in the screw plug 90 which is threadedly received by the threaded open end of valve chamber 61. An abutment washer 92 is irremovably secured on the extension 93 of the valve body, this abutment washer 92 being engaged by one end of spring 94, the other end of which engages the baffle disc or plate 80 urging it upon the spacer washer 81 and the spacer washer upon the valve 71. Inasmuch as the abutment collar 92, engaged by the spring 94, rests upon the movable screw plug 90, when the valve is assembled in the shock absorber, spring 94 will yieldably urge the valve 69 yieldably to engage the valve seat 72.

When the road wheel of the vehicle, not shown in the drawings, strikes an obstruction in the roadbed over which the vehicle is operated the axle 27 is thrust upwardly compressing the vehicle spring 29 and moving the shock absorber operating arm 25 in a clockwise direction as regards Figure 1. This moves the operating cam 38 in a similar direction resulting in the movement of the piston toward the left as regards Figure 2. Pressure exerted upon the fluid in chamber 45 under these circumstances will exert a fluid pressure upon the valve 69 within the valve chamber 61. The initial fluid flow permitted will be as follows: from the duct 60 through the space provided between the smaller diameter pilot of the valve and the inner wall of the duct into the groove 73 thence through the fluid flow restricting orifice 78 into the groove 77. From here the flow will flow through the space 85 between the baffle plate 80 and the valve into the valve chamber 61, thence through the passage 64 into the duct 62 and finally into the displacement chamber 46. The restriction to the fluid flow offered by the orifices 78 will cause the shock absorber to offer initial resistance to the upward movement of the axle. In case the fluid pressure in chamber 45 cannot properly be relieved by this initial fluid flow through the restricting orifices 78 then the valve 69 will be moved bodily by the fluid pressure against the effect of spring 94 so that the valve edge 74 will be moved from its seat 72 and thence an additional fluid flow will be provided from duct 60 through the side opening 76 in valve pilot portion around the valve flange 71 into the chamber 61 and thence through passage 64 and duct 62 into the displacement chamber 46.

Figure 2:
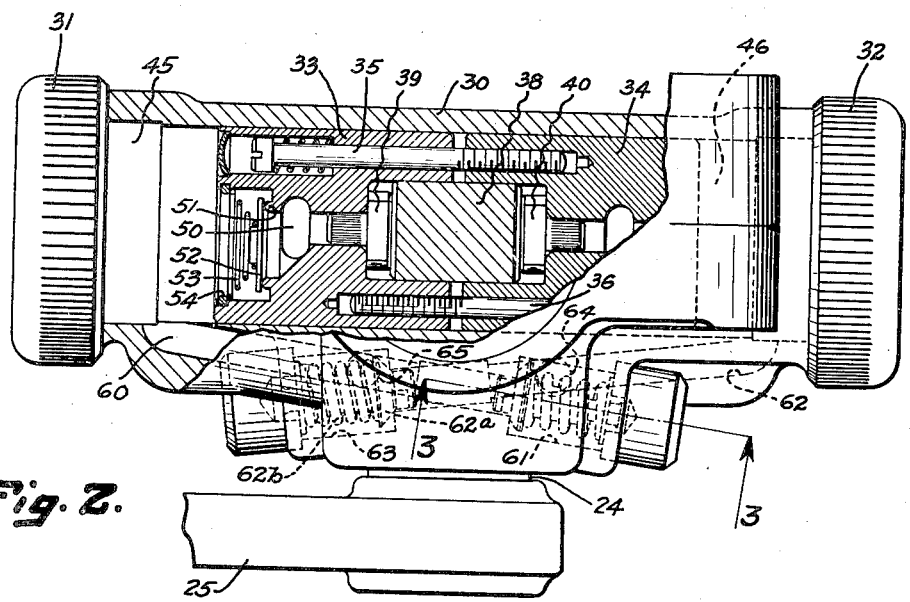
Figure 2 is a fragmentary, longitudinal, sectional view of the shock absorber as viewed from the top thereof.

As the vehicle spring 29 returns to normal position the movement of the shock absorber is reversed, that is, the piston will be moved to the right as regards Figures 1 and 2, and thus pressure will be exerted upon the fluid within the chamber 46 urging it through duct 62 against the valve 62a. An initial fluid flow, however, will again be established, this time from duct 62 through passage 64 into the valve chamber 61, thence through the opening 85 between the baffle plate 80 and valve-flange 71 into the groove 77 through the restricting orifices 78 into the groove 73 and then into the duct 60. Excessive pressures, not relievable by the flow through the orifices 78, will move the valve 62a from its seat against the effect of its spring 62b to provide a fluid flow directly past this valve into the chamber 63, thence through the passage 65 into the duct 60 and into the chamber 45.

Usually when fluid is forced through small orifices at comparatively high pressure, hissing and whistling noises are set up. However, in the present valve 69 such hissing and screaming noises are substantially eliminated due to the provision of the annular chambers into which the orifices discharge the fluid and also due to the fact that these annular chambers are baffled. As the fluid flows through the restricting orifices 78, it enters into a larger annular chamber provided by either groove 71 or 73 respectively, where said fluid pressure flow has an opportunity to expand after which said fluid will flow through restricting openings into the outer chambers. Experiments have positively proved that where a fluid forced at high pressure through a small orifice is directed into a larger expansion chamber having a restricted outlet the usually attending whistling or hissing noises of such a highly restricted fluid flow are dampened and substantially, if not completely, eliminated. In view of such experiences applicant has provided such increased expansion chambers in the form of annular grooves 71 and 73 at opposite ends of the restricting orifices 78. These grooves are in turn baffled, the first groove by the rigid disc 80 which is held in predetermined spaced relation relatively to the valve by the spacer washer 81, the second groove 73 by the valve-seat itself, designated by the numeral 72, the opening leading from the groove 73 being defined by the space provided between the inside wall of the duct 60 and the outer wall of the pilot portion of the valve 69 extending into said duct.

From the aforegoing it may be seen that applicant has provided a shock absorber having fluid flow control devices, certain of which are adapted to permit fluid flow in one direction only within the shock absorber, the other being adapted silently to provide a constantly restricted fluid flow in either direction initially within the shock absorber and an additional fluid flow in one direction only in response to a predetermined flow of fluid pressure. Applicant's fluid flow control devices and particularly the one permitting initial flow in either direction is of simple structure and design, easily assembled and capable of eliminating the usual noises found in valves providing for a highly restricted fluid flow.

While the embodiment of the present invention as herein disclosed, constitutes a preferred form, it is to be understood that other forms might be adopted, all coming within the scope of the claims which follow.

What is claimed is as follows:

1. In a fluid flow control device particularly adapted for use in a shock absorber having two fluid displacement chambers connected by ducts, each having a valve chamber providing a valve seat, the combination with a valve normally engaging a valve seat and having constantly open orifices providing communication between grooves on opposite surfaces of said valve; of baffle means for restricting the flow of fluid into and from each of said grooves, the valve seat providing the baffling means for one of said grooves, and a rigid disc carried by the valve and providing the baffling means for the other of said grooves.

2. In a fluid flow control device particularly adapted for use in a shock absorber having two fluid displacement chambers connected by ducts each having a valve chamber providing a valve seat, the combination with a valve having an annular groove in the side thereof engaging the valve seat, said groove being in constant communication with the respective duct; of an annular groove in the opposite side of said valve; fluid flow restricting ducts connecting said grooves; and a disc supported by the valve for baffling the flow of fluid into and out of the annular groove in the side of the valve opposite the valve seat, said valve seat providing a similar baffling means for the groove adjacent the duct; and a spring urging the disc upon the valve and the valve upon the valve seat.

3. In a fluid flow control device particularly adapted for use in a shock absorber having two fluid displacement chambers connected by ducts each of which has a valve chamber providing a valve seat in combination with a valve engaging the valve seat and having a constantly open, fluid flow restricting orifice, each end of which terminates in an annular groove in the valve; of a rigid disc supported upon the valve for baffling the flow of fluid into and out of one of said grooves, the valve seat for the valve providing means for baffling the fluid flow into and out of the other annular groove in the valve, and a spring urging the disc upon the valve and the valve upon its valve seat, said valve being adapted to permit a constantly restricted flow of fluid in either direction through its duct and to be actuated by fluid pressure to permit an additional fluid flow in one direction only through its duct.

4. In a fluid flow control device particularly adapted for use in a shock absorber having two fluid displacemeent chambers connected by ducts each of which has a valve chamber providing a valve seat, the combination with a valve normally engaging a valve seat and having an annular groove in the surface engaging said valve seat, said groove being in constant communication with a duct opening at said valve seat; of an annular groove in the opposite surface of said valve; a fluid flow restricting orifice connecting said grooves; a spacer washer of selected thickness on the valve; a baffle disc on the valve held in predetermined spaced relation to the one valve groove by said washer, said baffle disc impeding the fluid flow into and out of said valve groove; the valve seat impeding fluid flow into and out of said other valve groove; and a spring urging the baffle disc upon the spacer washer and the valve upon its seat.

5. In a fluid flow control device particularly adapted for use in a shock absorber having two fluid displacement chambers connected by ducts each of which has a valve chamber providing a valve seat, the combination with a valve normally engaging a valve seat and having constantly open, fluid flow restricting orifices each end terminating in an annular groove in the valve, the one groove being in constant communication with the duct; of a spacer washer of selected thickness on said valve engaging the side thereof more remote from the valve seat; a rigid disc covering the groove in the last mentioned side of the valve and held predeterminately spaced from the valve by a spacer washer, said disc baffling the flow of fluid into and out of said groove, the valve seat similarly baffling the flow of fluid into and out of its adjacent valve groove; and a spring urging the disc upon the washer and the valve upon its valve seat.

6. In a fluid flow control device particularly adapted for use in a shock absorber having two fluid displacement chambers connected by ducts, each of which has a valve chamber providing a valve seat, the combination with a pressure actuated valve normally engaging a valve seat and provided with a constantly open fluid flow restricting orifice; an annular groove in each side of the valve, said grooves communicating with the respective ends of the orifices; and a baffle for each groove, one provided by the valve seat, the other by a duct supported by the valve; and a spring urging the disc upon the valve and the valve upon its seat.

7. In a fluid flow control device particularly adapted for use in a shock absorber having two fluid displacement chambers connected by ducts each of which is a valve chamber providing a valve seat, the combination with a valve in a valve chamber engaging the seat therein, said valve comprising a cylindrical body portion of lesser diameter than the duct, and an annular flange, one end of the body portion extending into the duct so that one side of the flange portion engages the valve seat in said duct; of an annular groove in each of the two opposite sides of the valve flange, one groove being in constant communication with said duct, the other groove with the valve chamber in said duct; fluid flow restricting orifices connecting said annular grooves; and baffles for each groove, one baffle being provided by the valve seat, the other by a disc carried by the valve.

CARL W. GERHARDT.